(No Model.)

W. H. BAKER.
DRAFT EQUALIZER.

No. 275,321. Patented Apr. 3, 1883.

Witnesses.
Edwin L. Jewell
N. A. Toulmin

Inventor.
William H. Baker.
C. M. Alexander.
Attorney

UNITED STATES PATENT OFFICE.

WILLIAM H. BAKER, OF OXFORD, MICHIGAN, ASSIGNOR OF SIX-TENTHS TO ANDREW LENT, DANIEL C. BARBER, AND TRUMAN H. RICE, OF SAME PLACE.

DRAFT-EQUALIZER.

SPECIFICATION forming part of Letters Patent No. 275,321, dated April 3, 1883.

Application filed September 16, 1882. (No model.)

*To all whom it may concern:*

Be it known that I, WILLIAM H. BAKER, of Oxford, in the county of Oakland, and in the State of Michigan, have invented certain new and useful Improvements in Draft-Equalizers; and I do hereby declare that the following is a full, clear, and exact description thereof, reference being had to the accompanying drawings, and to the letters of reference marked thereon, making a part of this specification.

This invention relates to certain improvements in draft-equalizers; and it has for its objects to provide a combination of devices constituting an equalizer which may be applied to a vehicle having a pole and hounds, and to a vehicle having a single straight tongue without hounds, or to a plow or other tongueless agricultural implements, as more fully hereinafter specified. These objects I attain by the means illustrated in the accompanying drawings, in which—

Figure 1:
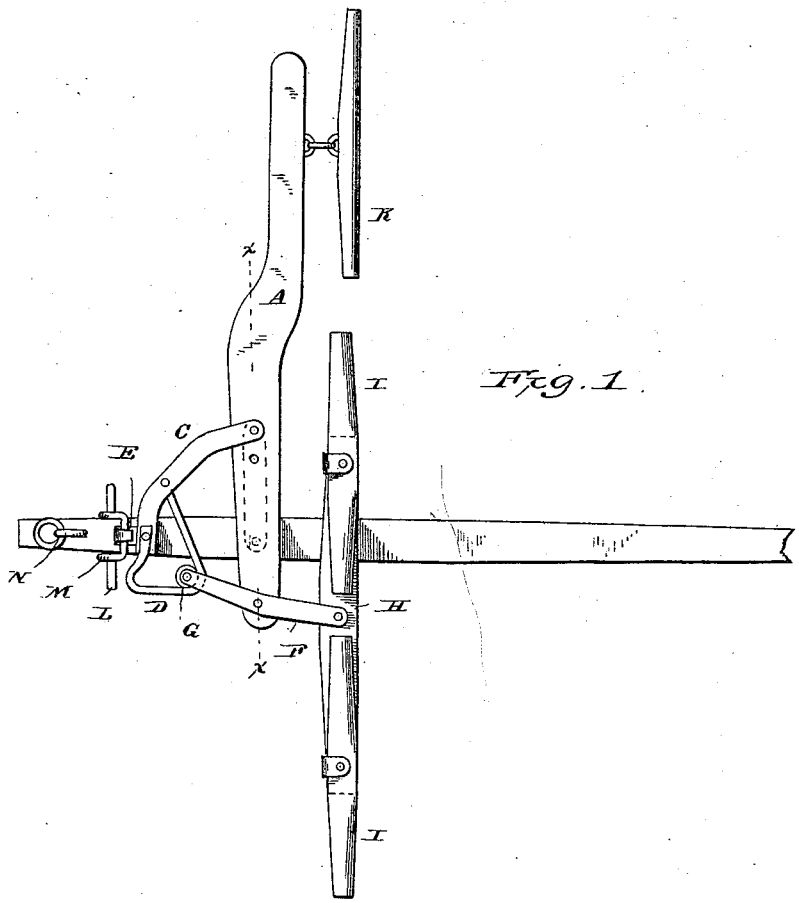
Figure 2:
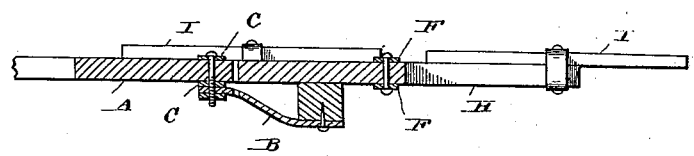

Figure 1 represents a top view, showing my invention applied to the pole of a wagon; and Fig. 2, a sectional view taken on line $x$ $x$ of Fig. 1.

The letter A indicates a bent lever adapted to be attached to the pole of a wagon or the clevis of a plow, as may be required. The said lever, when the device is to be employed in connection with the pole or tongue of a vehicle, is fulcrumed to an arm, B, secured to the under side of the tongue, and extending laterally to one side thereof. The said lever at its fulcrum is secured to a curved arm, C, which is provided with a triangular loop, D, and with a hook, E.

The letter F indicates two metallic flat bars, which are pivoted to the short arm of a lever, A, on opposite sides thereof. These bars embrace the loop D, and are provided with a friction-roller, G, which works against one of the sides of the loop, as more fully hereinafter specified. Between the forward ends of the bars is pivoted the whiffletree A, carrying the single-trees I at each end. The long arm of the lever A is provided with a single-tree, K.

When the apparatus is to be employed with a vehicle having hounds the rear end of the pole is placed between the forward ends of the hounds, and is connected by means of the usual bolt, L, thereto, the hook E being secured to the bail M, which embraces the forward ends of the hounds, and is secured to the said bolt L, which extends beyond the sides of the hounds for the purpose. If the vehicle is without hounds, a hole is bored one foot back of the original draft-hole, and the ring and eyebolt N are employed to make connection. For all agricultural implements in which a tongue or pole is dispensed with the curved arm and loop-hook are taken off, and the lever is attached directly to the clevis. The lever is provided with one or more apertures for the fulcrum-pin, by which the leverage may be varied, and the apparatus may be shifted so as to turn the long arm of the lever to either side, as may be desired, the lateral arm being provided with two or more apertures to permit the lever to be secured thereto when shifted laterally.

As the rod connecting the tongue of an ordinary two-horse wagon passes through the same from twelve to fifteen inches to the rear of the aperture through which the bolt connecting the ordinary double-tree passes, and as my equalizer as constructed for use is about thirteen inches from the hook at the rear to the center of the bent lever, it is evident that it can be employed on an ordinary vehicle without changing the length of the traces in most instances.

Having thus described my invention, what I claim, and desire to secure by Letters Patent, is—

1. In combination with the bent lever A, the arm C, having an angle-loop, D, connected with the lever, the arm B, to which said lever is fulcrumed, the bars F, the whiffle and single trees arranged as described, and the bolt L and bail M, the latter being engaged by the hook E on the arm C, substantially as and for the purposes specified.

2. The combination, with the lever A and the arm B, of the bent arm C, having an angle-loop, D, the bars F, and anti-friction roller G, the eyebolt and the ring N, and the whiffle and single trees H I K, the whole arranged substantially as and for the purposes specified.

In testimony whereof I affix my signature, in presence of two witnesses, this 17th day of August, 1882.

WILLIAM H. BAKER.

Witnesses:
GEORGE W. BIDWELL,
J. J. McCARTHY.